(12) United States Patent
Mount, III et al.

(10) Patent No.: US 9,162,421 B2
(45) Date of Patent: Oct. 20, 2015

(54) FILM WITH COMPOSTABLE HEAT SEAL LAYER

(75) Inventors: Eldridge M. Mount, III, Canandaigua, NY (US); Deepali Palta, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 339 days.

(21) Appl. No.: 13/455,313

(22) Filed: Apr. 25, 2012

(65) Prior Publication Data
US 2013/0288025 A1    Oct. 31, 2013

(51) Int. Cl.
*B32B 7/02* (2006.01)
*B32B 7/12* (2006.01)
*B32B 27/08* (2006.01)
*B32B 27/30* (2006.01)
*B32B 27/32* (2006.01)
*B32B 27/34* (2006.01)

(52) U.S. Cl.
CPC ... *B32B 7/02* (2013.01); *B32B 7/12* (2013.01); *B32B 27/08* (2013.01); *B32B 27/306* (2013.01); *B32B 27/32* (2013.01); *B32B 27/34* (2013.01); *B32B 2255/10* (2013.01); *B32B 2255/205* (2013.01); *B32B 2307/30* (2013.01); *B32B 2307/31* (2013.01); *B32B 2307/412* (2013.01); *B32B 2307/514* (2013.01); *B32B 2307/702* (2013.01); *B32B 2307/704* (2013.01); *B32B 2307/7163* (2013.01); *B32B 2307/7244* (2013.01); *B32B 2307/7246* (2013.01); *B32B 2307/746* (2013.01); *B32B 2307/75* (2013.01); *B32B 2439/46* (2013.01); *B32B 2439/70* (2013.01); *Y10T 428/24942* (2015.01)

(58) Field of Classification Search
CPC .............. B32B 7/02; B32B 37/02; B32B 27/28–27/42; B32B 27/306
USPC ......... 428/212, 349, 344, 354, 209, 220, 480, 428/483
See application file for complete search history.

(56) References Cited

U.S. PATENT DOCUMENTS

| 3,113,888 A | 12/1963 | Gold |
| 3,217,957 A | 11/1965 | Jarvie |
| 3,258,386 A | 6/1966 | Blythe |

(Continued)

FOREIGN PATENT DOCUMENTS

| CN | 1386631 A | 12/2002 |
| DE | 19523530 C1 | 9/1996 |

(Continued)

OTHER PUBLICATIONS

Hashimoto et al (JP 2000-185381) English translation, Apr. 7, 2000.*

(Continued)

*Primary Examiner* — Aaron Austin
*Assistant Examiner* — Lawrence Ferguson
(74) *Attorney, Agent, or Firm* — James R. Gourley; Colin P. Cahoon; Carstens & Cahoon, LLP (57) ABSTRACT

A multi-layer bio-based composite film with a bio-based heat seal layer. The compostable bio-based film can comprise a crystalline bio-based heat seal layer and an amorphous bio-based barrier web layer. The heat seal layer has a second heat melting temperature which is lower than its first heat melting temperature.

7 Claims, 3 Drawing Sheets

(56) References Cited

U.S. PATENT DOCUMENTS

| | | | |
|---|---|---|---|
| 3,438,428 A | 4/1969 | Balamuth |
| 3,459,610 A | 8/1969 | Dijkers |
| 3,477,970 A | 11/1969 | Beeman |
| 3,498,798 A | 3/1970 | Baur et al. |
| 3,647,111 A | 3/1972 | Stager |
| 4,198,256 A | 4/1980 | Andrews |
| 4,373,982 A | 2/1983 | Kreager |
| 4,414,045 A | 11/1983 | Wang |
| 4,418,841 A | 12/1983 | Eckstein |
| 4,551,371 A | 11/1985 | Eckstein |
| 4,595,611 A | 6/1986 | Quick |
| 4,647,332 A | 3/1987 | Ranger |
| 4,859,513 A | 8/1989 | Gibbons |
| 4,892,911 A | 1/1990 | Genske |
| 4,982,872 A | 1/1991 | Avery |
| 5,057,182 A | 10/1991 | Wuchinich |
| 5,059,804 A | 10/1991 | Fink |
| 5,108,807 A | 4/1992 | Tucker |
| 5,153,061 A | 10/1992 | Cavagna |
| 5,155,604 A | 10/1992 | Miekka |
| 5,180,765 A | 1/1993 | Sinclair |
| 5,192,620 A | 3/1993 | Chu |
| 5,205,473 A | 4/1993 | Coffin |
| 5,213,858 A | 5/1993 | Tanner et al. |
| 5,216,043 A | 6/1993 | Sipinen |
| 5,230,963 A | 7/1993 | Knoerzer |
| 5,250,627 A | 10/1993 | Yamamoto |
| 5,296,070 A | 3/1994 | Take |
| 5,332,586 A | 7/1994 | DiMino |
| 5,391,423 A | 2/1995 | Wnuk |
| 5,458,933 A | 10/1995 | Suskind |
| 5,487,940 A | 1/1996 | Bianchini |
| 5,500,459 A | 3/1996 | Hagemeyer |
| 5,506,036 A | 4/1996 | Bergerioux |
| 5,508,113 A | 4/1996 | Knoerzer |
| 5,512,338 A | 4/1996 | Bianchini |
| 5,525,421 A | 6/1996 | Knoerzer |
| 5,540,962 A | 7/1996 | Suskind |
| 5,587,048 A | 12/1996 | Streisel |
| 5,604,042 A | 2/1997 | Bianchini |
| 5,631,066 A | 5/1997 | O'Brien |
| 5,654,039 A | 8/1997 | Wenzel et al. |
| 5,679,421 A | 10/1997 | Brinton, Jr. |
| 5,731,093 A | 3/1998 | Chang |
| 5,736,204 A | 4/1998 | Suskind |
| 5,747,633 A | 5/1998 | Ito |
| 5,750,225 A | 5/1998 | Petty |
| 5,756,651 A | 5/1998 | Chen |
| 5,766,637 A | 6/1998 | Shine |
| 5,776,842 A | 7/1998 | Wood |
| 5,837,383 A | 11/1998 | Wenzel et al. |
| 5,849,374 A | 12/1998 | Gruber |
| 5,891,576 A | 4/1999 | Imai |
| 5,895,723 A | 4/1999 | Utz |
| 5,908,918 A | 6/1999 | Chen |
| 5,939,467 A | 8/1999 | Wnuk |
| 5,948,546 A | 9/1999 | Bafford |
| 5,985,772 A | 11/1999 | Wood |
| 6,003,670 A | 12/1999 | Beer |
| 6,025,028 A | 2/2000 | Asrar |
| 6,027,677 A | 2/2000 | Ostapchenko |
| 6,033,747 A | 3/2000 | Shiotani |
| 6,036,796 A | 3/2000 | Halbert |
| 6,071,618 A | 6/2000 | Cook |
| 6,080,478 A | 6/2000 | Karhuketo |
| 6,132,822 A | 10/2000 | Overcash |
| 6,146,508 A | 11/2000 | Gopalraja |
| 6,168,857 B1 | 1/2001 | Andersen |
| 6,176,953 B1 | 1/2001 | Landreth |
| 6,183,814 B1 | 2/2001 | Nangeroni et al. |
| 6,193,911 B1 | 2/2001 | Hunt |
| 6,200,404 B1 | 3/2001 | Andersen |
| 6,207,792 B1 | 3/2001 | Gruber |
| 6,232,389 B1 | 5/2001 | Feeney |
| 6,235,825 B1 | 5/2001 | Yoshida |
| 6,245,437 B1 | 6/2001 | Shiiki |
| 6,248,430 B1 | 6/2001 | Toyoda |
| 6,285,922 B1 | 9/2001 | Bloss |
| 6,294,047 B1 | 9/2001 | Chakar |
| 6,301,860 B1 | 10/2001 | Gunderman |
| 6,338,870 B1 | 1/2002 | Jaccoud |
| 6,350,531 B1 | 2/2002 | Sugimoto |
| 6,358,576 B1 | 3/2002 | Adur |
| 6,361,609 B1 | 3/2002 | Ouellette |
| 6,387,211 B1 | 5/2002 | Chakar |
| 6,492,613 B2 | 12/2002 | Bollinger et al. |
| 6,511,563 B2 | 1/2003 | Roylance |
| 6,523,732 B1 | 2/2003 | Popoola |
| 6,544,607 B1 | 4/2003 | Kuroki |
| 6,547,929 B2 | 4/2003 | Bobsein |
| 6,573,340 B1 | 6/2003 | Khemani |
| 6,574,944 B2 | 6/2003 | Capodieci |
| 6,576,294 B1 | 6/2003 | Phillips |
| 6,600,008 B1 | 7/2003 | Kobayashi |
| 6,645,584 B1 | 11/2003 | Kuusipalo |
| 6,649,732 B2 | 11/2003 | Kobayashi |
| 6,660,008 B1 | 12/2003 | Foerster |
| 6,660,211 B2 | 12/2003 | Topolkaraev |
| 6,677,048 B2 | 1/2004 | Karhuketo |
| 6,709,718 B2 | 3/2004 | O'Brien |
| 6,716,499 B1 | 4/2004 | Vadhar |
| 6,740,731 B2 | 5/2004 | Bigg |
| 6,769,229 B2 | 8/2004 | Kinigakis |
| 6,811,826 B2 | 11/2004 | Rule et al. |
| 6,815,079 B2 | 11/2004 | Rosenbaum |
| 6,824,632 B2 | 11/2004 | Blanchard |
| 6,863,644 B1 | 3/2005 | Cook |
| 6,877,975 B2 | 4/2005 | Wuchinich |
| 6,942,821 B2 | 9/2005 | Davrit |
| 6,960,374 B1 | 11/2005 | Terada |
| 6,974,612 B1 | 12/2005 | Frisk |
| 6,977,113 B2 | 12/2005 | Kody |
| 6,984,443 B2 | 1/2006 | Kuroki |
| 7,060,142 B2 | 6/2006 | Yamamoto |
| 7,128,969 B2 | 10/2006 | Busch |
| 7,132,490 B2 | 11/2006 | Obuchi et al. |
| 7,160,977 B2 | 1/2007 | Hale |
| 7,172,814 B2 | 2/2007 | Hudson |
| 7,173,080 B2 | 2/2007 | Yamada |
| 7,214,414 B2 | 5/2007 | Khemani |
| 7,223,359 B2 | 5/2007 | Torkelson |
| 7,351,449 B2 | 4/2008 | Hunt |
| 7,351,785 B2 | 4/2008 | Matsumoto |
| 7,368,160 B2 | 5/2008 | Inglis |
| 7,422,782 B2 | 9/2008 | Haedt |
| 7,514,528 B2 | 4/2009 | Kauffman |
| 7,520,959 B2 | 4/2009 | Kikuchi |
| 7,707,803 B2 | 5/2010 | Mori et al. |
| 7,718,718 B2 | 5/2010 | Kanzawa |
| 7,771,551 B2 | 8/2010 | Schroeder |
| 7,785,682 B2 | 8/2010 | Sato et al. |
| 7,794,555 B2 | 9/2010 | LaFond |
| 7,842,761 B2 | 11/2010 | Flynn |
| 7,854,994 B2 | 12/2010 | Henderson-Rutgers |
| 7,943,218 B2 | 5/2011 | Knoerzer |
| 7,951,436 B2 | 5/2011 | Knoerzer |
| 7,951,438 B2 | 5/2011 | Lee |
| 8,105,667 B2 | 1/2012 | Knoerzer |
| 8,201,606 B2 | 6/2012 | Specht |
| 8,225,583 B2 | 7/2012 | Waldherr |
| 8,507,084 B2 | 8/2013 | Deng |
| 8,734,933 B2 | 5/2014 | Paolilli et al. |
| 8,795,803 B2 | 8/2014 | Paolilli et al. |
| 8,859,056 B2 | 10/2014 | O'Neill et al. |
| 2001/0001284 A1 | 5/2001 | Shaw |
| 2002/0014318 A1 | 2/2002 | Bobsein |
| 2002/0098341 A1 | 7/2002 | Schiffer |
| 2002/0127358 A1 | 9/2002 | Berlin |
| 2002/0160201 A1 | 10/2002 | Ohkura |
| 2003/0008136 A1 | 1/2003 | Bliznyuk |
| 2003/0162013 A1 | 8/2003 | Topolkaraev |
| 2003/0166748 A1 | 9/2003 | Khemani |
| 2003/0193104 A1 | 10/2003 | Melican |
| 2003/0215644 A1 | 11/2003 | Deshpande |

(56) References Cited

U.S. PATENT DOCUMENTS

| | | |
|---|---|---|
| 2004/0029258 A1 | 2/2004 | Heaney |
| 2004/0076778 A1 | 4/2004 | Mori |
| 2004/0115424 A1 | 6/2004 | Cowton |
| 2004/0185287 A1 | 9/2004 | Reighard |
| 2004/0229327 A1 | 11/2004 | Agblevor |
| 2005/0096422 A1 | 5/2005 | Torkelson |
| 2005/0112363 A1 | 5/2005 | Ning |
| 2005/0136202 A1 | 6/2005 | Kendig |
| 2005/0194110 A1 | 9/2005 | Richardson |
| 2006/0019045 A1 | 1/2006 | Bourgeois |
| 2006/0046006 A1 | 3/2006 | Bastion et al. |
| 2006/0057260 A1 | 3/2006 | Barry |
| 2006/0069234 A1 | 3/2006 | Kauffman |
| 2006/0099436 A1 | 5/2006 | Schwark |
| 2006/0110615 A1 | 5/2006 | Karim |
| 2006/0144905 A1 | 7/2006 | Oblak |
| 2006/0159860 A1 | 7/2006 | Korowicki |
| 2006/0177674 A1 | 8/2006 | Aritake |
| 2006/0194010 A1 | 8/2006 | Hiscock |
| 2006/0207295 A1 | 9/2006 | Huenermann |
| 2006/0275563 A1 | 12/2006 | Duffy |
| 2006/0286323 A1 | 12/2006 | Siegel |
| 2007/0037912 A1 | 2/2007 | Mohanty |
| 2007/0059541 A1 | 3/2007 | Yoshida |
| 2007/0154719 A1 | 7/2007 | Meijlink et al. |
| 2007/0158012 A1 | 7/2007 | Heil |
| 2007/0184220 A1 | 8/2007 | Cleveland |
| 2007/0224368 A1 | 9/2007 | Hara |
| 2007/0259139 A1 | 11/2007 | Furneaux |
| 2008/0038560 A1 | 2/2008 | Knoerzer |
| 2008/0069988 A1 | 3/2008 | Sato |
| 2008/0070047 A1 | 3/2008 | Rehkugler |
| 2008/0107847 A1 | 5/2008 | Yamane |
| 2008/0131616 A1 | 6/2008 | Besson |
| 2008/0241500 A1 | 10/2008 | Hoegg |
| 2009/0017240 A1 | 1/2009 | Charbonnel et al. |
| 2009/0022919 A1 | 1/2009 | Chicarella |
| 2009/0061126 A1 | 3/2009 | Knoerzer |
| 2009/0081396 A1 | 3/2009 | Hokari et al. |
| 2009/0142614 A1 | 6/2009 | Mori |
| 2009/0148713 A1 | 6/2009 | Lee |
| 2009/0148715 A1 | 6/2009 | Lee |
| 2009/0199964 A1 | 8/2009 | Fayet |
| 2009/0200359 A1 | 8/2009 | Chen |
| 2009/0220794 A1 | 9/2009 | O'Neill |
| 2009/0250171 A1 | 10/2009 | Wieduwilt |
| 2009/0253871 A1 | 10/2009 | Flynn |
| 2009/0269580 A1 | 10/2009 | Shiba et al. |
| 2009/0286090 A1 | 11/2009 | Ting |
| 2009/0311544 A1 | 12/2009 | Lee |
| 2009/0324917 A1 | 12/2009 | Wang |
| 2009/0324972 A1 | 12/2009 | Hoffman et al. |
| 2010/0009208 A1 | 1/2010 | Lee |
| 2010/0040904 A1 | 2/2010 | Cloutier |
| 2010/0062269 A1 | 3/2010 | Ogita |
| 2010/0072104 A1 | 3/2010 | Kohl |
| 2010/0101722 A1 | 4/2010 | Suto |
| 2010/0147466 A1 | 6/2010 | Sans Marimon |
| 2010/0178394 A1 | 7/2010 | Exner |
| 2010/0178523 A1 | 7/2010 | Iyengar et al. |
| 2010/0184891 A1 | 7/2010 | Akutsu et al. |
| 2010/0209614 A1 | 8/2010 | Sakata |
| 2010/0221560 A1* | 9/2010 | Knoerzer et al. ............ 428/458 |
| 2010/0330382 A1 | 12/2010 | Dou |
| 2011/0005959 A1 | 1/2011 | Van Puijenbroek |
| 2011/0027590 A1 | 2/2011 | Abe |
| 2011/0072766 A1 | 3/2011 | Haus |
| 2011/0081543 A1 | 4/2011 | Lee |
| 2011/0104437 A1 | 5/2011 | Yamamura |
| 2011/0200844 A1 | 8/2011 | Fayne |
| 2011/0244185 A1 | 10/2011 | Dou |
| 2012/0111476 A1 | 5/2012 | Bang |
| 2012/0141766 A1 | 6/2012 | Paulino |
| 2012/0219790 A1 | 8/2012 | Mount |
| 2012/0288693 A1 | 11/2012 | Stanley et al. |
| 2013/0101831 A1 | 4/2013 | Knoerzer et al. |
| 2013/0101855 A1 | 4/2013 | Cham |
| 2013/0122280 A1 | 5/2013 | Yokota |

FOREIGN PATENT DOCUMENTS

| | | |
|---|---|---|
| DE | 10347015 A1 | 4/2005 |
| EP | 0058571 A1 | 8/1982 |
| EP | 0229476 A1 | 7/1987 |
| EP | 0333390 | 9/1989 |
| JP | 2000-185381 | 7/2000 |
| JP | 2003-191425 | 7/2003 |
| JP | 2003-276144 | 9/2003 |
| JP | 2004106314 | 4/2004 |
| JP | 2004-256570 | 9/2004 |
| JP | 2004-351629 | 12/2004 |
| JP | 2007-083409 | 4/2007 |
| JP | 2011-63002 | 3/2011 |
| WO | 9601736 | 1/1996 |
| WO | 9618544 A1 | 6/1996 |
| WO | 9631303 | 10/1996 |
| WO | 2004-093883 A2 | 11/2004 |
| WO | 2006/029835 A1 | 3/2006 |
| WO | 2007/047133 A1 | 4/2007 |
| WO | 2012/085060 A1 | 4/2013 |

OTHER PUBLICATIONS

Agarwal, Mukul, et al. "Characterization of the Degradation of Polylactic Acid Polymer in a Solid Substrate Environment," Biotechnol. Prog. 1998, vol. 14, pp. 517-526 (10 pages).

Devlieger, J.J., "Green plastics for food packaging," TNO Industrial Technology, Chapter 24, pp. 519-534, The Netherlands, date unknown.

Goldsberry, Clare, "The Greening of an Industry: PLA film coatings replacing thermoplastics," Modern Plastics Worldwide magazine, Feb. 2007, pp. 54 and 56, United States.

Kolybaba, M., "Biodegradable Polymers: Past, Present, and Future" The Society for Engineering in Agricultural, Food, and Biological Systems, Paper No. RRV03-00007, Oct. 2003, 15 pages.

Liu, Lillian, "Bioplastics in Food Packaging: Innovative Technologies for Biodegradable Packaging" San Jose State University Packaging Engineering, Feb. 2006, 13 pages.

Malwitz, Matthew M., et al., "Orientation of Platelets in Multilayered Nanocomposite Polymer Films," Journal of Polymer Science: Part B: Polymer Physics, vol. 41, 3237-3248 (2003) © Wiley Periodicals, Inc., United States.

NatureWorks LLC PLA Polymer 4032D "Biaxially Oriented Films—High Heat" pp. 1-3, © 2005.

NatureWorks LLC Health and Safety, "Material Safety Data Sheet" pp. 1-10, Jul. 19, 2006.

"Nanophasen-Materialen" In: Rompp Lexikon Chemie, 10. Auflage, 1998, Thieme Verlag, StuttgartISBN: 3-13-734910-9vol. 4, p. 2804 (3 pages).

"PCT International Search Report dated Nov. 22, 2013, from PCT Application No. PCT/US13/47106 (7 pages)."

"PCT International Search Report dated Dec. 2, 2013, from PCT Application No. PCT/US13/47128 (8 pages)."

Tokiwa, Yutaka "Biodegradability of Plastics," Int. J. of Mol. Sci. Sep. 2009, 10(9):3722-3724, published online Aug. 26, 2009 (18 pages).

PCT International Search Report dated Feb. 21, 2014, from PCT Application No. PCT/US13/53478 (6 pages).

PCT International Search Report dated Feb. 21, 2014, from PCT Application No. PCT/US13/53473 (6 pages).

Machine translation of German Patent Publication No. DE10347015 A1 published on Apr. 28, 2005 (5 pages).

Machine translation of Japanese Patent Publication No. 2011/063002 A2 published on Mar. 31, 2011 (18 pages).

Kim & Chang translation of excerpt of Japanese Patent Publication No. 2011/063002 A2 published on Mar. 31, 2011 (1 page).

Smook, Gary A., The Handbook for Pulp and paper Technologists, Chapter 14—Secondary Fiber, pp. 205-217.

(56) References Cited

OTHER PUBLICATIONS

Somiya, Satoshi et al., "Degradation phenomena under water environment of cotton yarn reinforced Polylactic-acid," T. Prouix (ed), Time Dependent Constitutive Behavior and Fracture/Failure Processes, vol. 3, Conference Proceedings of the Society for Experimental Mechanics Series 15, DOI 10.1007/978-1-4419-9794-4_27, The Society for Experimental Mechanics, Inc. 2011, pp. 175-182 •.

PCT International Search Report dated Apr. 3, 2014 from PCT Application No. PCT/US13/68512 (8 pages).

Schmitz, Peter, et al. "Films," Ullmann's Encyclopedia of Industrial Chemistry, 5th ed., vol. A11 (1988), pp. 85-110 (26 pages).

* cited by examiner

FILM WITH COMPOSTABLE HEAT SEAL LAYER

BACKGROUND OF THE INVENTION

1. Technical Field

The present invention relates to a flexible packaging film with a compostable, bio-based heat seal layer that can be used in packaging products and to a method of making the bio-based packaging material.

2. Description of Related Art

Multi-layered film structures made from petroleum-based products originating from fossil fuels are often used in flexible packages where there is a need for its advantageous barrier, sealant, and graphics-capability properties. Barrier properties in one or more layers are important in order to protect the product inside the package from light, oxygen or moisture. Such a need exists, for example, for the protection of foodstuffs, which may run the risk of flavor loss, staling, or spoilage if insufficient barrier properties are present to prevent transmission of such things as light, oxygen, or moisture into the package. The sealant properties are important in order to enable the flexible package to form an airtight or hermetic seal. Without a hermetic seal, any barrier properties provided by the film are ineffective against oxygen, moisture, or aroma transmission between the product in the package and the outside. A graphics capability is needed because it enables a consumer to quickly identify the product that he or she is seeking to purchase, allows food product manufacturers a way to label the nutritional content of the packaged food, and enables pricing information, such as bar codes, to be placed on the product.

Figure 1:
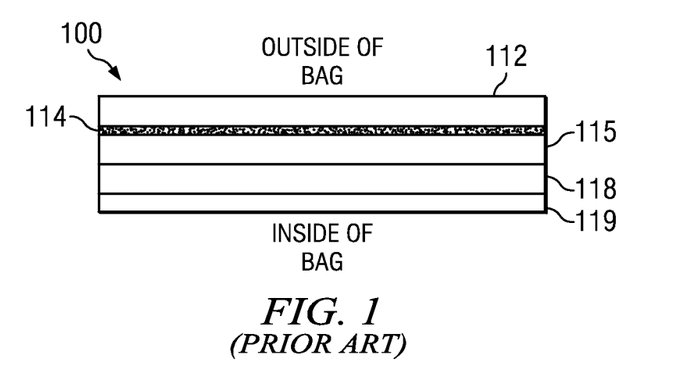
FIG. 1 depicts a cross-section of an exemplary prior art packaging film.

One prior art multi-layer or composite film used for packaging potato chips and like products is illustrated in FIG. 1 which is a schematic of a cross section of the multi-layer film 100 illustrating each individual substantive layer. Each of these layers functions in some way to provide the needed barrier (layer 118), sealant (layer 119), and graphics capability properties. The graphics layer 114 is typically used for the presentation of graphics that can be reverse-printed and viewed through a transparent outer base layer 112. Like numerals are used throughout this description to describe similar or identical parts, unless otherwise indicated. The outer base layer 112 is typically oriented polypropylene ("OPP") or polyethylene terephthalate ("PET"). A metal layer disposed upon an inner base layer 118 provides the required barrier properties. It has been found and is well-known in the prior art that metalizing a petroleum-based polyolefin such as OPP or PET reduces the moisture and oxygen transmission through the film by approximately three orders of magnitude. Petroleum-based OPP is typically utilized for base layers 112, 118 because of its lower cost. A sealant layer 119 disposed upon the OPP layer 118 enables a hermetic seal to be formed. Typical prior art sealant layers 119 include an ethylene-propylene co-polymer and an ethylene-propylene-butene-1 ter-polymer. A glue or laminate layer 115, typically a polyethylene extrusion, is sometimes required to adhere the outer base layer 112 with the inner, product-side base layer 118.

Other materials used in packaging are typically petroleum-based materials such as polyester, polyolefin extrusions, adhesive laminates, and other such materials, or a layered combination of the above.

Figure 2:
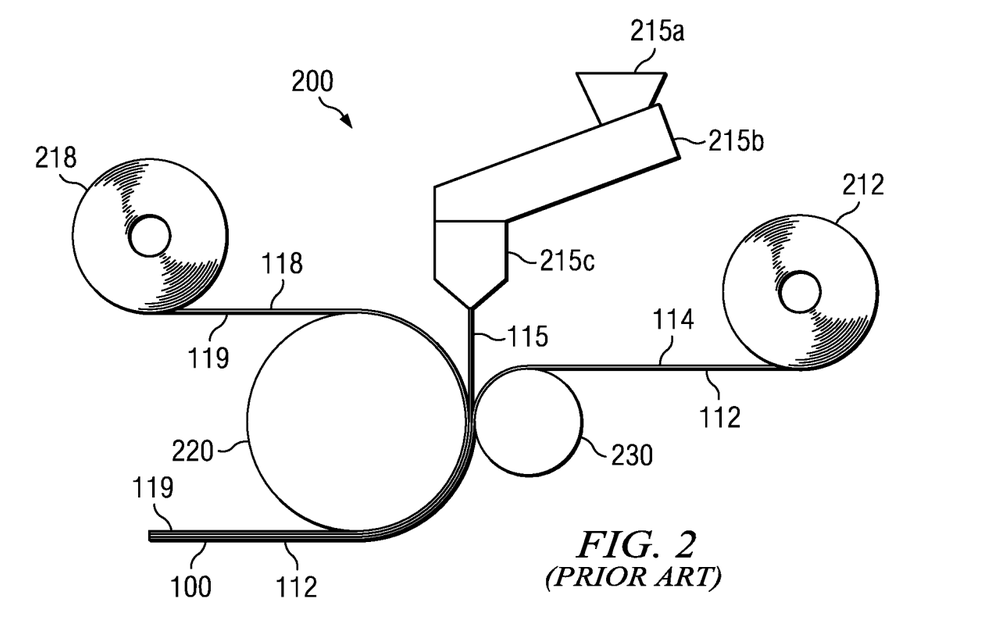
FIG. 2 depicts the exemplary formation of a prior art packaging film.

FIG. 2 demonstrates schematically the formation of material, in which the OPP layers 112, 118 of the packaging material are separately manufactured, then formed into the final material 100 on an extrusion laminator 200. The OPP layer 112 having graphics 114 previously applied by a known graphics application method such as flexographic or rotogravure is fed from roll 212 while OPP layer 118 is fed from roll 218. At the same time, resin for PE laminate layer 115 is fed into hopper 215a and through extruder 215b, where it will be heated to approximately 600° F. and extruded at die 215c as molten polyethylene 115. This molten polyethylene 115 is extruded at a rate that is congruent with the rate at which the petroleum-based OPP materials 112, 118 are fed, becoming sandwiched between these two materials. The layered material 100 then runs between chill drum 220 and nip roller 230, ensuring that it forms an even layer as it is cooled. The pressure between the laminator rollers is generally set in the range of 0.5 to 5 pounds per linear inch across the width of the material. The large chill drum 220 is made of stainless steel and is cooled to about 50-60° F., so that while the material is cooled quickly, no condensation is allowed to form. The smaller nip roller 230 is generally formed of rubber or another resilient material. Note that the layered material 100 remains in contact with the chill drum 220 for a period of time after it has passed through the rollers, to allow time for the resin to cool sufficiently. The material can then be wound into rolls (not specifically shown) for transport to the location where it will be used in packaging. Generally, it is economical to form the material as wide sheets that are then slit using thin slitter knives into the desired width as the material is rolled for shipping.

Figure 3:
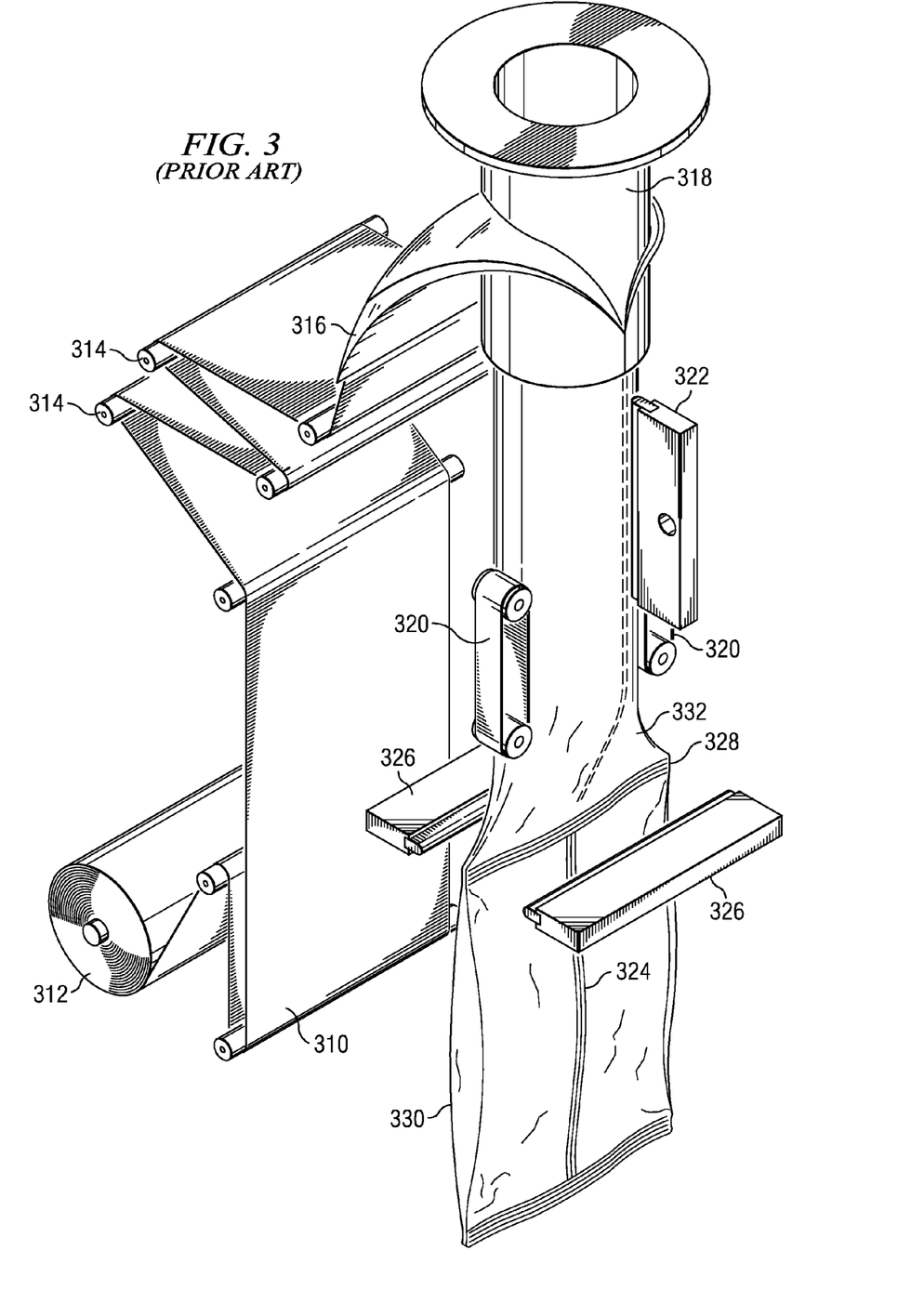
FIG. 3 depicts a vertical form, fill, and seal machine that is known in the prior art.

Once the material is formed and cut into desired widths, it can be loaded into a vertical form, fill, and seal machine to be used in packaging the many products that are packaged using this method. FIG. 3 shows an exemplary vertical form, fill, and seal machine that can be used to package snack foods, such as chips. This drawing is simplified, and does not show the cabinet and support structures that typically surround such a machine, but it demonstrates the working of the machine well. Packaging film 310 is taken from a roll 312 of film and passed through tensioners 314 that keep it taut. The film then passes over a former 316, which directs the film as it forms a vertical tube around a product delivery cylinder 318. This product delivery cylinder 318 normally has either a round or a somewhat oval cross-section. As the tube of packaging material is pulled downward by drive belts 320, the edges of the film are sealed along its length by a vertical sealer 322, forming a back seal 324. The machine then applies a pair of heat-sealing jaws 326 against the tube to form a transverse seal 328. This transverse seal 328 acts as the top seal on the bag 330 below the sealing jaws 326 and the bottom seal on the bag 332 being filled and formed above the jaws 326. After the transverse seal 328 has been formed, a cut is made across the sealed area to separate the finished bag 330 below the seal 328 from the partially completed bag 332 above the seal. The film tube is then pushed downward to draw out another package length. Before the sealing jaws form each transverse seal, the product to be packaged is dropped through the product delivery cylinder 318 and is held within the tube above the transverse seal 328.

Petroleum-based prior art flexible films comprise a relatively small part of the total waste stream produced when compared to other types of packaging. However, because petroleum films are environmentally stable, they have a relatively low rate of degradation. Consequently, such films can survive for long periods of time in a landfill. Another disadvantage of petroleum-based films is that they are made from oil, which many consider to be a limited, non-renewable resource. Consequently, a need exists for a biodegradable or compostable flexible film made from a renewable resource. In one embodiment, such film should be food safe and have the requisite barrier properties to store a low moisture shelf-stable food for an extended period of time without the product staling. The film should have the requisite sealable and coefficient of friction properties that enable it to be used on existing vertical form, fill, and seal machines.

SUMMARY OF THE INVENTION

The present invention is directed towards a flexible packaging film with a bio-based, compostable heat seal layer that can be used in packaging products. The bio-based heat seal layer comprises at least one of a polyhydroxybutyrate-valerate ("PHBV") rich resin, a or polyhydroxy-alkanoate ("PHA") resin, with certain properties that allow it to be coextruded as a heat seal layer for a biaxially oriented multilayer polymer film.

In one embodiment, the multi-layer product side film composite comprises a barrier adhesion layer and a heat seal layer adhered to opposite sides of a barrier web layer, wherein the heat seal layer comprises a heat seal bio-based polymer comprising a first heat melting temperature and a second heat melting temperature, wherein the second heat melting temperature of the heat seal bio-based polymer is lower than the first heat melting temperature of the heat seal bio-based polymer. In another embodiment, the barrier web layer comprises a barrier web bio-based polymer having a first heat melting temperature, which is within 20° C. of the heat seal bio-based polymer first heat melting temperature.

In another embodiment, the barrier adhesion layer comprises a barrier adhesion bio-based polymer having a first heat melting temperature, which is within 20° C. of the heat seal bio-based polymer first heat melting temperature. In still another embodiment, the second heat melting temperature of the heat seal bio-based polymer is at least 20° C. lower than the first heat melting temperature of the heat seal bio-based polymer.

In one embodiment, the barrier web comprises a barrier web polymer comprising a second heat melting temperature which is higher than the second heat melting temperature of the heat seal bio-based polymer. In another embodiment, the barrier adhesion layer comprises a barrier adhesion polymer comprising a second heat melting temperature which is higher than the second heat melting temperature of the heat seal bio-based polymer. In still another embodiment, the barrier web comprises an amorphous bio-based polymer and the heat seal polymer comprises a crystalline bio-based polymer.

In one embodiment, a method of making a product side composite comprises co-extruding a barrier web layer between a barrier adhesion layer and a heat seal layer, wherein the heat seal layer comprises a heat seal bio-based polymer comprising a first heat melting temperature and a second heat melting temperature, wherein the second heat melting temperature of the heat seal bio-based polymer is lower than the first heat melting temperature of the heat seal bio-based polymer.

Other aspects, embodiments and features of the invention will become apparent from the following detailed description of the invention when considered in conjunction with the accompanying figures. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

The present invention is directed towards use of a bio-based, compostable polymer resin as the heat seal layer of a multi-layer polymer film. As used herein, the term "bio-based polymer" means a polymer where at least 80% of the polymer by weight is derived from a non-petroleum or biorenewable feedstock. In one embodiment, up to about 20% of the bio-based film can comprise a conventional polymer sourced from petroleum.

One problem with bio-based polymer resins, such as PHBV, PHA and PLA, is that some such resins are difficult to form into co-extrusion laminated polymer films. As a result, such films cannot currently be used exclusively in packaging. Using bio-based resins as the heat seal layer has not been done previously in the art because of the difficulty in processing.

Figure 5:
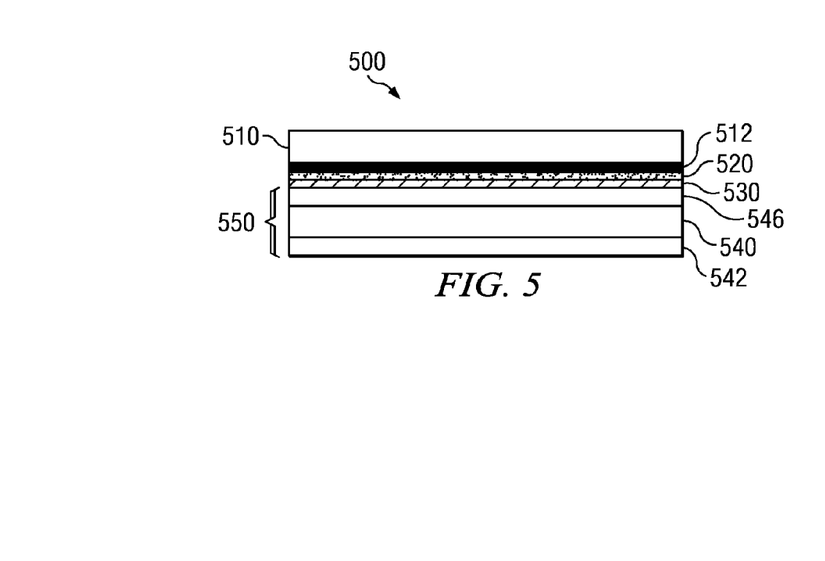
FIG. 5 depicts a magnified schematic cross-section of a multi-layer packaging film made according to one embodiment of the invention.

FIG. 5 depicts one embodiment of the multi-layer polymer film 500 that is partially formed by the product side composite 550 of the present invention with a bio-based heat seal layer. The product side composite 550 comprises a barrier adhesion layer 546, barrier web layer 540, and sealant layer 542. A barrier layer 530 is applied to the barrier adhesion layer 546, which itself is adhered to a print web layer 510, which if transparent may optionally include a reverse-printed graphics layer 512, by adhesive layer 520.

Figure 4:
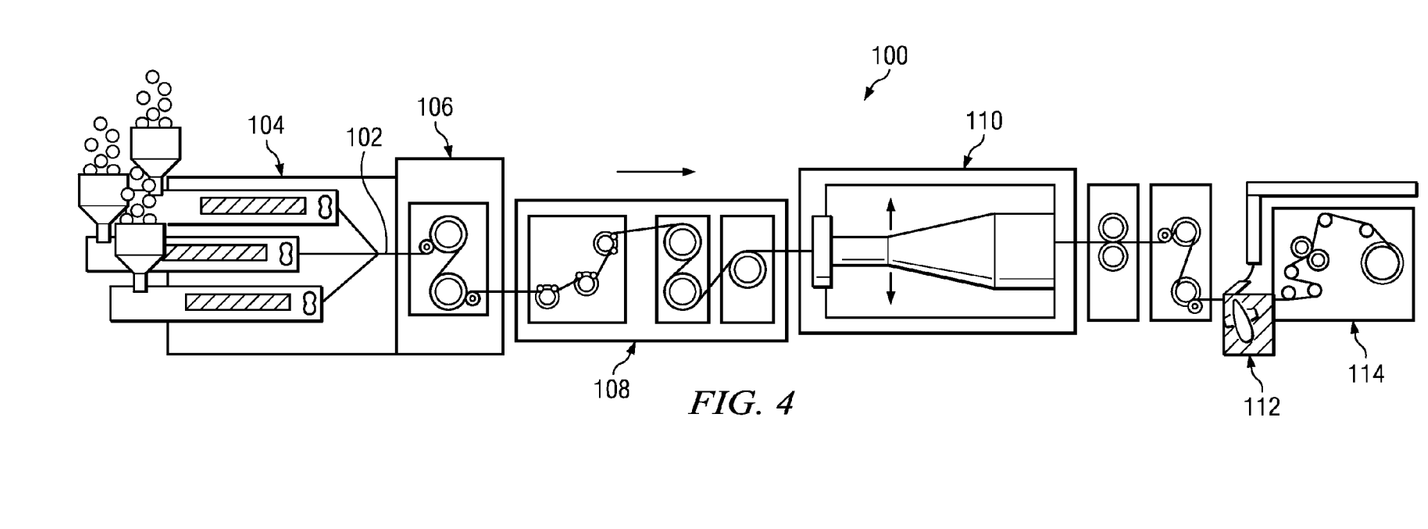
FIG. 4 is a schematic representation of the process of co-extruding a multilayer polymer film in accordance with one embodiment of the present invention.

One method of making the product side composite 550 of the multi-layer film of the present invention is depicted in FIG. 4. Three polymer resins are heated and co-extruded in an extrusion unit 104 to form a multi-layer laminate composite 102. The composite 102 is chilled on chill drums in a chilling unit 106, and then stretched (oriented) in the machine direction in machine stretching unit 108. The composite is typically stretched in the machine direction by running each successive roller at a faster speed than the previous roller. The machine stretched composite is then stretched (oriented) in the transverse direction in a transverse stretching unit 110. The composite is typically stretched in the transverse direction using a "tenter" stretcher, which basically stretches the composite film between moving edge grips within a variable width frame as it travels through the transverse stretching unit 110, which is usually also heated to facilitate stretching. The biaxially oriented film is then optionally cut into sheets and stacked, rolled onto a storage roller (114), or further processed, such as adding a barrier layer and/or combined with a graphics layer to make the film depicted in FIG. 5.

In one aspect of the invention, the polymer resin used for the heat seal layer 542 is a bio-based polymer resin with certain characteristics that enable its use as the heat seal layer. For example, after the heat seal layer has been extruded and cast with the barrier web layer, the heat seal layer must have a glass transition and melting temperature below the glass transition and melting temperature of the barrier web layer. The reason this is important is that when the heat seal equipment 322 and 326 depicted in FIG. 3 create the fin or top and bottom seal, the heat seal layer must flow and seal before the barrier web layer because changes in the barrier web layer can disrupt the barrier layer and therefore the functionality of the film as a moisture and oxygen barrier.

However, the polymer resins that are input into the extrusion unit 104 may have different physical properties before and after extrusion. The reason this occurs is that the first time a polymer resin is heated beyond its melting temperature in a differential scanning calorimeter (DSC), the processing conditions used to create the polymer resin will affect the glass transition and melting temperatures. The first heating cycle is referred to as the "first heat". When the same polymer resin already subjected to first heat is heated a second time beyond its melting point in a DSC, it can have different melting temperatures. The second heating cycle is called the "second heat". Thus, the first heat melting temperature and the second heat melting temperature can be different quantities. DSC methods of determining the glass transition and melting point of polymers are known in the art.

Similarly, the melting temperature of the polymer resin prior to extrusion casting or co-extrusion can be different than the melting temperature of the polymer film after extrusion. Applicants herein have discovered several bio-based resins that can be used effectively as a heat seal layer in conjunction with other bio-based polymers because they possess at least two characteristics (1) the bio-based heat seal resins have a first heat melting temperature approximately equivalent to bio-based resins that can be used as the barrier web layer and barrier adhesion layer, making them highly compatible as a co-extruded sheet, and (2) the bio-based heat seal resins also have second heat melting temperatures substantially below the first heat melting temperature, which allows them to be biaxially oriented and to melt and form a seal at temperatures below the temperature at which the barrier web and barrier adhesion layers melt and flow.

Another important aspect of the bio-based heat seal layer resins of the present invention is their ability to be processed on existing polymer film production equipment. Applicants herein have found that highly crystalline bio-based polymer resins have a lower coefficient of friction against the steel surfaces encountered by the polymer film during production, which improves their processability. More highly crystalline polymers also have a sharper melting point than less crystalline polymers. This property will help prevent the film from sticking to hot metal surfaces, and jamming during packaging and sealing operations. Finally, more highly crystalline polymers are less likely to block during storage when wound onto a roll after formation. Addition of anti-block particles may still be necessary, but at lower amounts than required by the prior art.

However, highly crystalline and slowly crystallizing polymers do not stretch as easily as amorphous, partial or controlled crystallinity polymers, due to internal fibrillation and voiding in the crystalline polymer. Therefore, Applicants have found that when a highly crystalline bio-based polymer is used as the heat seal layer, it should be combined with a barrier web layer comprising an amorphous bio-based polymer, which stretches more readily and provides support to the crystalline layer during processing. The amorphous barrier web layer and more crystalline heat seal layer work together to form a composite film with highly desirable properties. In one embodiment, the film is stretched at least 2.7× in the machine direction and at least 5× in the transverse direction.

In one embodiment of the present invention, the bio-based heat seal layer comprises less than 20% of the total weight of the product side composite film. If more than 20% by weight of a highly crystalline bio-based heat seal layer is used, the film is too difficult to process and will not form a film with desirable heat seal properties. In another embodiment, the bio-based heat seal layer is greater than 0.5 microns in thickness. Thicknesses below this limit will not permit adequate heat seal formation. In one embodiment, the practical upper limit for heat seal layer thickness is about 2 microns.

Applicants herein created several inventive multi-layered film sheets in accordance with the present invention. All of the multi-layered film sheets had a barrier web layer comprising NatureWorks 4032D (a PLA resin) and a barrier adhesion layer comprising NatureWorks 4042D (also a PLA resin). The following list of bio-based polymer resins were used to form a successful heat seal layer on these example inventive films: Enmat 5010P, a PHBV resin; Enmat 6010P, a PHBV resin; Metabolix P5001, a PHA resin; Metabolix P5001-HC, a PHA resin; and Meridian 11209, a PHA resin. These bio-based heat seal resins had first heat melting temperatures between about 150° C. and 170° C., and second heat melting temperatures between about 50° C. and 130° C. The first and second heat melting temperatures for the PLA resins used as the barrier web layer and barrier adhesion layer were between about 150° C. and 170° C. The technical effect of the difference in first and second heat melting temperature for the heat seal bio-based polymer is that it was able to be effectively co-extruded with the other bio-based polymers, to be biaxially oriented into a film and yet melt and form a seal at a lower temperature when used to form packages.

Thus, in one embodiment, the product side composite comprises a barrier adhesion layer and a heat seal layer adhered to opposite sides of a barrier web layer, wherein the heat seal layer comprises a heat seal bio-based polymer comprising a first heat melting temperature and a second heat melting temperature, wherein the second heat melting temperature of the heat seal bio-based polymer is lower than the first heat melting temperature of the heat seal bio-based polymer. In another embodiment, the barrier web layer comprises a barrier web bio-based polymer having a first heat melting temperature, which is within 20° C. of the heat seal bio-based polymer first heat melting temperature. In another embodiment, the barrier adhesion layer comprises a barrier adhesion bio-based polymer having a first heat melting temperature, which is within 20° C. of the heat seal bio-based polymer first heat melting temperature. In still another embodiment, the second heat melting temperature of the heat seal bio-based polymer is at least 20° C. lower than the first heat melting temperature of the heat seal bio-based polymer. In another embodiment, the barrier web polymer comprises a second heat melting temperature which is higher than the second heat melting temperature of the heat seal bio-based polymer. In another embodiment, the barrier adhesion polymer comprises a second heat melting temperature which is higher than the second heat melting temperature of the heat seal bio-based polymer.

In one embodiment, the biodegradable, bio-based film used for the heat seal layer 542 comprises polyhydroxyalkanoate ("PHA"), available from Archer Daniels Midland of Decatur, Ill. PHA is a polymer belonging to the polyesters class and can be produced by microorganisms (e.g. *Alcaligenes eutrophus*) as a form of energy storage. In one embodiment, microbial biosynthesis of PHA starts with the condensation of two molecules of acetyl-CoA to give acetoacetyl-CoA which is subsequently reduced to hydroxybutyryl-CoA. Hydroxybutyryl-CoA is then used as a monomer to polymerize PHB, the most common type of PHA.

In the embodiment shown in FIG. 5, the heat sealant layer 542 can be folded over and then sealed on itself to form a tube having a fin seal for a backseal. The fin seal is accomplished by the application of heat and pressure to the film. Alternatively, a thermal stripe can be provided on the requisite portion of the bio-based film to permit a lap seal to be used.

In one embodiment, the present invention provides a bio-based film comprising acceptable barrier properties. As used herein, a film having acceptable oxygen barrier properties has an oxygen transmission rate of less than about 150 cc/m²/day. As used herein, a film having acceptable moisture barrier properties comprises a water vapor transmission rate of less than about 5 grams/m²/day.

The metalized barrier/adhesion improving film layer 546 adjacent to the bio-based barrier web 540 can be one or more polymers selected from polypropylene, an ethylene vinyl alcohol ("EVOH") formula, polyvinyl alcohol ("PVOH"), polyethylene, polyethylene terephthalate, nylon, and a nanocomposite coating.

Below depicts EVOH formulas in accordance with various embodiments of the present invention.

[Ethylene]  -  [vinyl alcohol]

The EVOH formula used in accordance with the present invention can range from a high ethylene EVOH to a low ethylene EVOH. As used herein a high ethylene EVOH corresponds to the above formula wherein n=25. As used herein, a low ethylene EVOH corresponds to the above formula wherein n=80. Low ethylene EVOH provides oxygen barrier properties but is more difficult to process. When metalized, EVOH provides acceptable moisture barrier properties. In one embodiment, the EVOH formula can be coextruded with a bio-based film layer 540 comprising PLA and the EVOH can then be metalized by methods known in the art including vacuum deposition.

In one embodiment, the metalized barrier/adhesion improving film layer comprises a metalized amorphous polyester, APET 416 that is less than about 10 gauge and preferably between about 2 and about 4 gauge in thickness. The APET can be coextruded with the bio-based film layer 540 comprising PLA and the APET can then be metalized by methods known in the art. In one embodiment, the metalized film 416 comprises a PVOH coating that is applied to the PLA as a liquid and then dried and stretched during film orientation, or coated onto a film and dried.

In one embodiment, one or both bio-based films 510 540 consists of only PLA, or consists essentially of PLA. Alternatively, additives can be added to the outer base layer PLA film 540 or the barrier layer bio-based film 540 during the film making process to improve film properties such as the rate of biodegradation such as those disclosed in U.S. Patent Application Publication Number 2008/0038560 and U.S. patent application Ser. No. 12/707,368. Other optional additives that may be included in the polymer are fillers that increase the opacity of the film layer, such as titanium dioxide (TiO2).

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

While this invention has been particularly shown and described with reference to a preferred embodiment, it will be understood by those skilled in the art that various changes in form and detail may be made therein without departing from the spirit and scope of the invention.

What is claimed is:

1. A multi-layer product side film composite comprising: a barrier adhesion layer and a heat seal layer adhered to opposite sides of a barrier web layer, wherein the heat seal layer comprises a heat seal bio-based polymer comprising a first heat melting temperature and a second heat melting temperature, wherein the second heat melting temperature of the heat seal bio-based polymer is lower than the first heat melting temperature of the heat seal bio-based polymer.

2. The composite of claim 1 wherein the barrier web layer comprises a barrier web bio-based polymer having a first heat melting temperature, which is within 20° C. of the heat seal bio-based polymer first heat melting temperature.

3. The composite of claim 1 wherein the barrier adhesion layer comprises a barrier adhesion bio-based polymer having a first heat melting temperature, which is within 20° C. of the heat seal bio-based polymer first heat melting temperature.

4. The composite of claim 1 wherein the second heat melting temperature of the heat seal bio-based polymer is at least 20° C. lower than the first heat melting temperature of the heat seal bio-based polymer.

5. The composite of claim 1 wherein the barrier web comprises a barrier web polymer comprising a second heat melting temperature which is higher than the second heat melting temperature of the heat seal bio-based polymer.

6. The composite of claim 1 wherein the barrier adhesion layer comprises a barrier adhesion polymer comprising a second heat melting temperature which is higher than the second heat melting temperature of the heat seal bio-based polymer.

7. The composite of claim 1 wherein the barrier web comprises an amorphous bio-based polymer and the heat seal polymer comprises a crystalline bio-based polymer.

* * * * *